US011104243B2

(12) United States Patent
Krammer et al.

(10) Patent No.: US 11,104,243 B2
(45) Date of Patent: Aug. 31, 2021

(54) METHOD FOR OPERATING A VEHICLE CHARGING APPARATUS, VEHICLE CHARGING APPARATUS, AND SYSTEM COMPRISING A SENSOR APPARATUS AND A VEHICLE CHARGING APPARATUS

(71) Applicant: AUDI AG, Ingolstadt (DE)

(72) Inventors: Johann Krammer, Ingolstadt (DE); Gerhard Paris, Ingolstadt (DE); Axel Vogel, Ingolstadt (DE); Heiko Stephan, Demling (DE)

(73) Assignee: AUDI AG, Ingolstadt (DE)

( * ) Notice: Subject to any disclaimer, the term of this patent is extended or adjusted under 35 U.S.C. 154(b) by 133 days.

(21) Appl. No.: 16/613,528

(22) PCT Filed: Apr. 16, 2018

(86) PCT No.: PCT/EP2018/059646
§ 371 (c)(1),
(2) Date: Nov. 14, 2019

(87) PCT Pub. No.: WO2018/219544
PCT Pub. Date: Dec. 6, 2018

(65) Prior Publication Data
US 2020/0070678 A1 Mar. 5, 2020

(30) Foreign Application Priority Data

May 31, 2017 (DE) .......................... 102017209128.2

(51) Int. Cl.
*B60L 53/62* (2019.01)
*B60L 50/64* (2019.01)
(Continued)

(52) U.S. Cl.
CPC ............... *B60L 53/62* (2019.02); *B60L 50/64* (2019.02); *B60L 53/14* (2019.02); *B60L 53/18* (2019.02);
(Continued)

(58) Field of Classification Search
CPC ...................................................... B60L 53/62
(Continued)

(56) References Cited

U.S. PATENT DOCUMENTS

2004/0169489 A1 * 9/2004 Hobbs .................... B60L 53/31
320/104
2011/0278920 A1 * 11/2011 Sakamoto ............... B60L 53/66
307/10.1
(Continued)

FOREIGN PATENT DOCUMENTS

DE  102012217580 A1  4/2013
DE  102013220683 A1  10/2014
(Continued)

OTHER PUBLICATIONS

International Preliminary Report on Patentability with English-language translation of the Written Opinion dated Dec. 12, 2019 in corresponding International Application No. PCT/EP2018/059646; 7 pages.
(Continued)

*Primary Examiner* — Jerry D Robbins
(74) *Attorney, Agent, or Firm* — Maier & Maier, PLLC

(57) ABSTRACT

A method for operating a vehicle charging apparatus for charging a vehicle battery. A particular line on the decoupling-point side is initially assigned to the first line on the charging-apparatus side by changing the charging current of a particular line on the charging-apparatus side and evaluating the line on the decoupling-point side in which a change
(Continued)

can likewise be determined. This process is repeated for at least one second line on the charging-apparatus side.

8 Claims, 3 Drawing Sheets

(51) Int. Cl.
*B60L 53/66* (2019.01)
*B60L 53/18* (2019.01)
*B60L 53/63* (2019.01)
*H02J 7/04* (2006.01)
*H02J 3/26* (2006.01)
*B60L 53/14* (2019.01)

(52) U.S. Cl.
CPC .............. *B60L 53/63* (2019.02); *B60L 53/66* (2019.02); *H02J 3/26* (2013.01); *H02J 7/045* (2013.01)

(58) Field of Classification Search
USPC .......................................... 320/109
See application file for complete search history.

(56) References Cited

U.S. PATENT DOCUMENTS

| | | | | |
|---|---|---|---|---|
| 2012/0277942 A1* | 11/2012 | Vilar | ................ | B60L 50/10 |
| | | | | 701/22 |
| 2013/0147431 A1* | 6/2013 | Lim | ................ | B60W 10/26 |
| | | | | 320/109 |
| 2016/0159235 A1* | 6/2016 | Yang | ................ | B60L 53/24 |
| | | | | 320/109 |
| 2019/0106002 A1* | 4/2019 | Gotz | ................ | H02P 29/0241 |

FOREIGN PATENT DOCUMENTS

| | | |
|---|---|---|
| DE | 102014208015 A1 | 10/2015 |
| DE | 102014216020 A1 | 2/2016 |
| DE | 102015113771 A1 | 3/2016 |
| DE | 112014002840 T5 | 3/2016 |
| EP | 2645528 A2 | 10/2013 |

OTHER PUBLICATIONS

International Search Report and Written Opinion dated Jul. 20, 2018 in corresponding International Application No. PCT/EP2018/059646; 26 pages.

* cited by examiner

|    | F1 | F2 | F3 |
|----|----|----|----|
| V1 | L1 | L2 | L3 |
| V2 | L2 | L3 | L1 |
| V3 | L3 | L1 | L2 |

Fig.1

METHOD FOR OPERATING A VEHICLE CHARGING APPARATUS, VEHICLE CHARGING APPARATUS, AND SYSTEM COMPRISING A SENSOR APPARATUS AND A VEHICLE CHARGING APPARATUS

FIELD

The present invention relates to a method for operating a vehicle charging apparatus for charging a vehicle battery. It further relates to a vehicle charging apparatus for charging a vehicle battery, comprising a communication device, which is designed to communicate with a sensor device of a three-phase electrical decoupling point; a first, a second, and a third charging-apparatus-side electrical connection for supplying energy to charge the vehicle battery; an output connection for coupling with the vehicle battery; as well as a control device for controlling the charging of the vehicle battery, wherein the control device is designed to input up-to-date current values for the current strength of a respective current into the vehicle charging apparatus by means of the communication device, said current flowing in a first, a second, and a third decoupling-point-side electrical line at the output of the decoupling point. Finally, the invention relates to a system comprising a sensor device of a three-phase decoupling point and a vehicle charging apparatus.

BACKGROUND

Charging of electrified vehicles can take place by means of three-phase current. This is typically the case at public charging stations and primarily in the private domain. If the charging process is implemented in the private domain, the electric vehicle obtains current via the house connection. A typical charging capacity of an electric vehicle is between 11 kW and 22 kW. In this process, it should be noted that houses have different house-connection outputs in different countries. Thus, a typical German house connection provides outputs on a scale of 30 kW. In France or Italy on the other hand, houses only have a relatively small house-connection output, which can be in a range of 7 kW over all three electrical phases. This means that actually a higher connection output would be necessary in the house for charging a modern electric vehicle with full charging power.

If additional consuming units are activated in the house during the charging process of the electric vehicle, the total of the consuming unit capacity may be higher than the house-connection fuse will allow. Clearly, a scenario can be envisioned in which the charging process of the electric vehicle is started directly after arrival at home and simultaneously an electric oven is switched on to prepare supper.

In order to prevent total failure in the house in these situations caused by triggering of the main fuse, a current-sensor is installed on all three lines directly at the house connection to provide a so-called blackout protection function. The current-sensor measures the up-to-date current strength for each of the three electrical phases and can provide information regarding the current still available per electrical line up to the load limit using information on a maximum permissible current per electrical line. Modern electric vehicles can access this information via digital communication with the current-sensor. Typically, the loads of the individual current phases are not equal, because most household consuming units are only connected in single-phase. In order to still be able to use the maximum potential charging capacity, the current-sensor information regarding the load of the electrical phases is evaluated by the vehicle charging apparatus. If the corresponding electrical line is at the load limit, the charging capacity of the particular electrical line is reduced by the vehicle.

In this context, DE 10 2013 220 683 A1 discloses a device and a method for detecting an electrical phase sequence in a vehicle. A control module is used for operative coupling with a supply network in order to receive an incoming power signal from same, wherein the incoming power signal provides a first voltage and a second voltage in a vehicle. The control module is configured to determine an electrical phase difference between the first voltage and the second voltage and to determine a signal frequency of the incoming signal in order to determine the type of supply network for the country. The control module is further configured to control a number of switching devices in order to determine an output voltage signal on the basis of the electrical phase difference and the signal frequency for charging at least one battery in the vehicle.

DE 10 2012 217 580 A1 discloses scanning a charging current for a high-voltage battery through a certain predefined range, and its assigned parameters of the electrical system can be measured during operation. During operation, the system efficiency can be determined as a function of the charging current. The battery charging unit system can operated for a short time to provide various charging currents to the traction battery. The system efficiency can then be reported as a function of the charging current.

DE 10 2015 113 771 A1 relates to the detection and notification of changing electrical conditions during charging of a vehicle battery. Because different devices connected to the electrical circuit have different draw-off characteristics, they are considered in order to optimize the current draw.

DE 10 2014 216 020 A1 describes a charging unit with a monitoring device as well as a current-control device. In this case, the current-control device comprises a receiving unit, which is configured to receive a control command transmitted by the monitoring device, and a control unit, which is configured to reduce or to limit the charging current as a function of the control command.

Despite these measures, problems repeatedly occur in practical use when charging electric vehicles; in particular, the house fuse is triggered time and again.

SUMMARY

The object of the present invention is to provide a method, as mentioned as the start, as well as a vehicle charging apparatus, and a system comprising a sensor device and a vehicle charging apparatus, whereby a more reliable charging of a vehicle battery is enabled via a house connection.

In the following statements, the general term "electrical decoupling point" is sometimes used instead of the term "house connection," because the invention can likewise be used, for example, in a garage sub-distribution unit or in a sub-distribution unit of an industrial facility.

As shown in the exemplary embodiment, a charging apparatus according to the invention can be housed in the vehicle; however, it may also be arranged outside of the vehicle.

The present invention is based on the knowledge that the vehicle requires classification of the messages transferred from the current-sensor to the charging-apparatus-side connections, so that the information of the current-sensor can be correctly evaluated regarding the load of the decoupling-point-side electrical lines. The reason for this is that, even though a clockwise three-phase current field must be applied in the supply network according to standard, it is not necessary that phase L1 in line VL1 of the first decoupling-point-side connection V1 also be applied in line FL1 at the first charging-apparatus-side connection F1 to fulfill this requirement. In very many electrical installations, the electrical phases are inadvertently distorted, for example via a lower decoupling point. According to standard, it does not matter as long as the result is a clockwise power supply. In this context, it is assumed that the respective first connection is assigned to a plug and/or a socket of a first position, the respective second connection is assigned to a second position, and the respective third connection is assigned to a third position.

For example, a clockwise field also develops with the assignments shown in FIG. 1. In doing so, the charging-apparatus-side connections are designated as F1, F2, and F3, while the decoupling-point-side connections are designed as V1, V2, and V3. The electrical phases are designated as L1, L2, and L3.

The second line in FIG. 1, accordingly, depicts a 1:1 assignment; with the third line, the electrical phases are shifted by one; while in the fourth line, they are shifted by two. A clockwise field is generated in all three cases. FIG. 1 shows that, despite correct installation, the connections can be assigned differently on the vehicle charging apparatus and at the decoupling point. When viewed from the perspective of the vehicle charging apparatus, the connection at which the charging current must be reduced is unclear. For this reason, the previously mentioned DE 10 2013 220 683 A1 does not provide any means of achieving the aforementioned object, because, in this case, the electrical phase difference is always only determined relatively. The assignment according to lines 3 and 4 of FIG. 1 cannot be determined by means of the teaching from the aforementioned publication.

While in Germany, the colors of the electrical phases are standardized (L1=brown, L2=gray, L3=black), this is not the case in many other countries. Frequently, installations are carried out by private individuals themselves, for example via various clamping devices from the house connection to a connection in the garage, wherein continuous, correct wiring is not ensured.

Known systems, comprising a current-sensor as well as a vehicle charging apparatus, for example a so-called wall box, offer the possibility of implementing a manual assignment of the electrical connections on the vehicle charging apparatus according to the messages from the current-sensor via a control apparatus, for example comprising a display and a selector switch. This procedure is suitable when the vehicle is always charged at the same connection. However, such an assignment can only be implemented by trained personnel. For laypersons in electrical engineering, the necessity of the assignment is very difficult to understand and laborious to implement.

Furthermore, it must be considered that the charging equipment may be different at different locations. For example, the charging cable can be removed from the housing of the so-called wall box of the applicant and carried along on vacation or on trips, for example. If this charging cable is then plugged into a different socket, i.e. not at the socket at home in which a manual assignment has been implemented, a new configuration of the electrical connections would be necessary in order to ensure the assignment.

The present invention solves these problems in that the electrical connections and/or lines at the decoupling point, for example the house connection, are assigned automatically, i.e. by means of the vehicle charging apparatus, to the connections on the vehicle charging apparatus. To this end, the vehicle charging apparatus successively executes a targeted change in the charging capacity of an electrical line of a charging-apparatus-side connection and analyzes the change by evaluating the current-sensor measured values at the connections and/or in the lines at the decoupling point. The three connections on the vehicle charging apparatus can be assigned to the three connections on the decoupling point in that a charging capacity variation has been carried out successively for at least two electrical connections.

Through these measures, a triggering of the house fuse can be reliably prevented even when there is faulty wiring between the house connection and the connection for the vehicle charging apparatus. On the other hand, the vehicle battery can be charged with maximum charge capacity and thus a minimal charging time. For users, the invention represents an enormous facilitation of the configuration complexity and thereby a reduction in the installation costs. Due to the automatic configuration, the risk of triggering the house fuse is reduced, particularly with changing charging locations, and a maximum charging performance is automatically ensured.

In order to simplify the designs within the scope of the present invention, the wiring is only addressed with respect to the three electrical phases. As obvious to one skilled in the art, the wiring may comprise further lines, for example a grounding wire connection and a neutral line.

In step d), the charging of the vehicle battery preferably takes place with a charging current load, per charging-apparatus-side electrical line, which is equal to the lowest maximum potential further current load determined in step c). In this manner, the time duration optimal for charging the vehicle battery can be utilized for the assignment according to the invention between connections at the decoupling point and connections on the vehicle charging apparatus. Particularly in this context, the charging capacity of the respective charging-apparatus-side electrical line is then reduced in step e). On one hand, the charging capacity optimal at this point in time is utilized and, on the other hand, an overload can be reliably prevented. In other embodiments of the invention, a maximum potential additional current load significantly lower than the lowest determined in step c) can obviously also be used in step d) such that the charging capacity of the respective charging-apparatus-side electrical line can optionally be increased with the variation in step e). It is decisive that the current load is varied such that the total from the charging current load according to step d) and the current load variation is less than or equal to the maximum potential additional current load determined in step c).

For a plausibility check and to prevent faults, steps e) to i) can moreover be repeated for the third charging-apparatus-side electrical line.

Preferably, the method further comprises the following steps:

I1) checking whether the result from step k) agrees with the results from steps i) and j); I2)

I2) if the result from step I1) is negative, repeating of steps a) through k);

I3) if the result from step I1) is positive, storing of the determined assignment of the three decoupling-point-side electrical lines to the three charging-apparatus-side electrical lines.

In this manner, the consequences of measurement errors, for example due to brief disturbances, can be eliminated. Such a refinement of the method according to the invention is therefore characterized by an especially extensive reliability and robustness.

The input in step b) can take place conductively, for example by means of a power line, or wirelessly, particularly via WLAN, ZigBee, or Bluetooth.

Further advantageous embodiments result from the dependent claims.

BRIEF DESCRIPTION OF THE DRAWINGS

The preferred embodiments shown with reference to the method according to the invention and the advantages thereof apply accordingly, to the extent applicable, to a vehicle charging apparatus according to the invention for charging a vehicle battery as well as to a system according to the invention comprising a sensor device of a three-phase decoupling point and a vehicle charging apparatus according to the invention.

An exemplary embodiment of the present invention will now be described in greater detail in the following with reference to the enclosed drawings. The following is shown:

Figure 1:
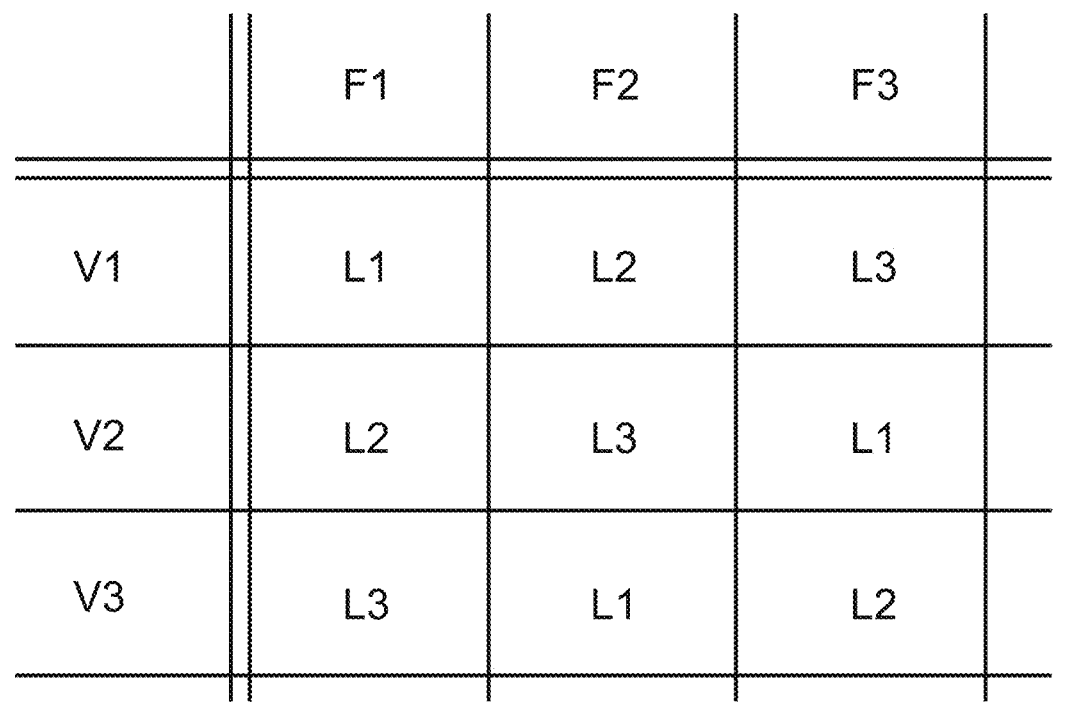

FIG. 1 a table with different wiring configurations between a decoupling point with connections V1 to V3 and a vehicle charging apparatus with connections F1 to F3;

DETAILED DESCRIPTION

Figure 2:
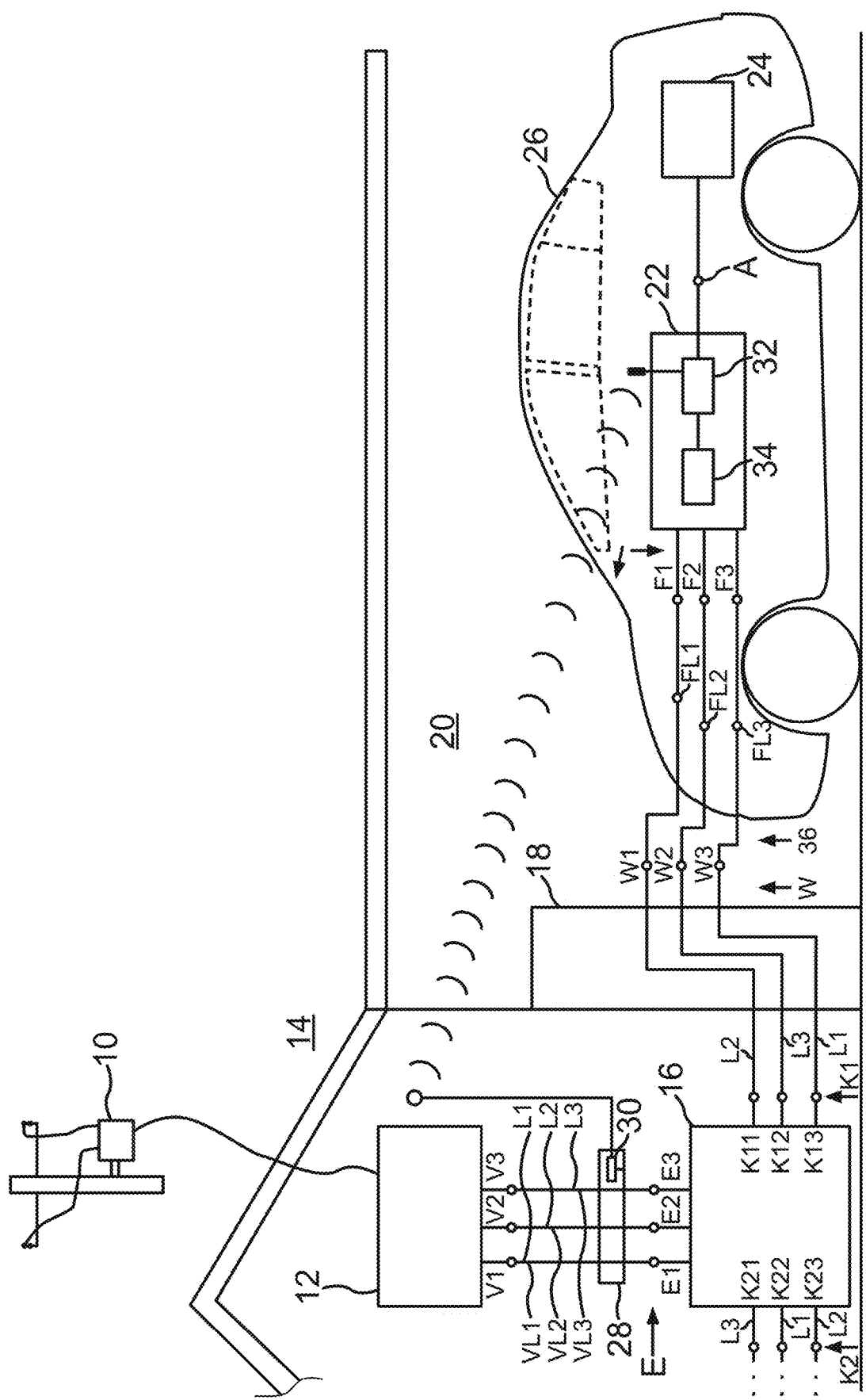
FIG. 2 a schematic representation in order to illustrate the method according to the invention.

FIG. 2 shows a schematic representation in order to illustrate the method according to the invention. In this case, current from a distribution transformer 10 is routed to a fuse box 12 in a house 14. The fuse box 12 comprises three output connections V1, V2, V3 at lines VL1, VL2, V13, at which the three electrical phases L1, L2, L3 of a three-phase current are provided. In the figure, electrical phase L1 is provided at connection V1, i.e. in line VL1; electrical phase L2 is provided at connection V2, i.e. in line VL2; and electrical phase L3 is provided at connection V3, i.e. in line VL3.

Output connections V1 to V3 are coupled to input connections E1, E2, E3 of a terminal box 16. This box has, for example, two connecting sockets K1, K2, wherein a first connecting socket K1 comprises connections K11, K12, K13, while a second connecting socket K2 comprises connections K21, K22, K23. Connections K11, K12, K13 are assigned to fixed positions in the first connecting socket K1; connections K21, K22, K23 are assigned to fixed positions in connecting socket K2.

As shown in the drawing, electrical phase L2 is provided at connection K11, electrical phase L3 is provided at connection K12, electrical phase L1 is provided at connection K13, while electrical phase L3 is provided at connection K21, electrical phase L1 is provided at connection K22, and electrical phase L2 is provided at connection K23. Accordingly, a clockwise three-phase current field is provided at both sockets K1, K2. While the first connection V1 of the fuse box 12 provided electrical phase L1, electrical phase L2 is provided at the first connection K11 of the first socket K1, and electrical phase L3 is provided at the first connection K21 of the second socket K2. The same thing applies to the respective second and third connections.

The first socket K1, which comprises connections K11, K12, K13, is coupled with connections W1, W2, W3 of a connection W of a wall box 18 in a garage 20 belonging to the house 14. Connections W1 to W3 are coupled, via a charging cable 36, with corresponding connections F1 to F3 of a socket F of a charging apparatus 22 for charging a vehicle battery 24 of a motor vehicle 26. Accordingly, electrical phase L2 is present at connection F1, electrical phase L3 is present at connection F2, and electrical phase L1 is present at connection F3. The connection between the charging apparatus 22 and the vehicle battery 24 may be single-phase or multi-phase depending on whether the charging apparatus 22 charges the vehicle battery with direct-current, alternating current, or three-phase current.

A current-sensor 28 is arranged between the fuse box 12 and the terminal box 16, said sensor being designed to determine up-to-date sensor values for the current strength of the respective current, which flows in the first, the second, and the third electrical line VL1, VL2, VL3 at the output of the fuse box 12 with connections V1, V2, and V3.

The sensor device 28 comprises a communication device 30, which is configured to communicate wirelessly with a corresponding communication device 32 of the vehicle charging apparatus 22 in order to transfer the currently determined sensor values to the vehicle charging apparatus 22. Alternatively, the communication may also be conductive, particularly it can take place via LAN or powerline communication.

Figure 3:
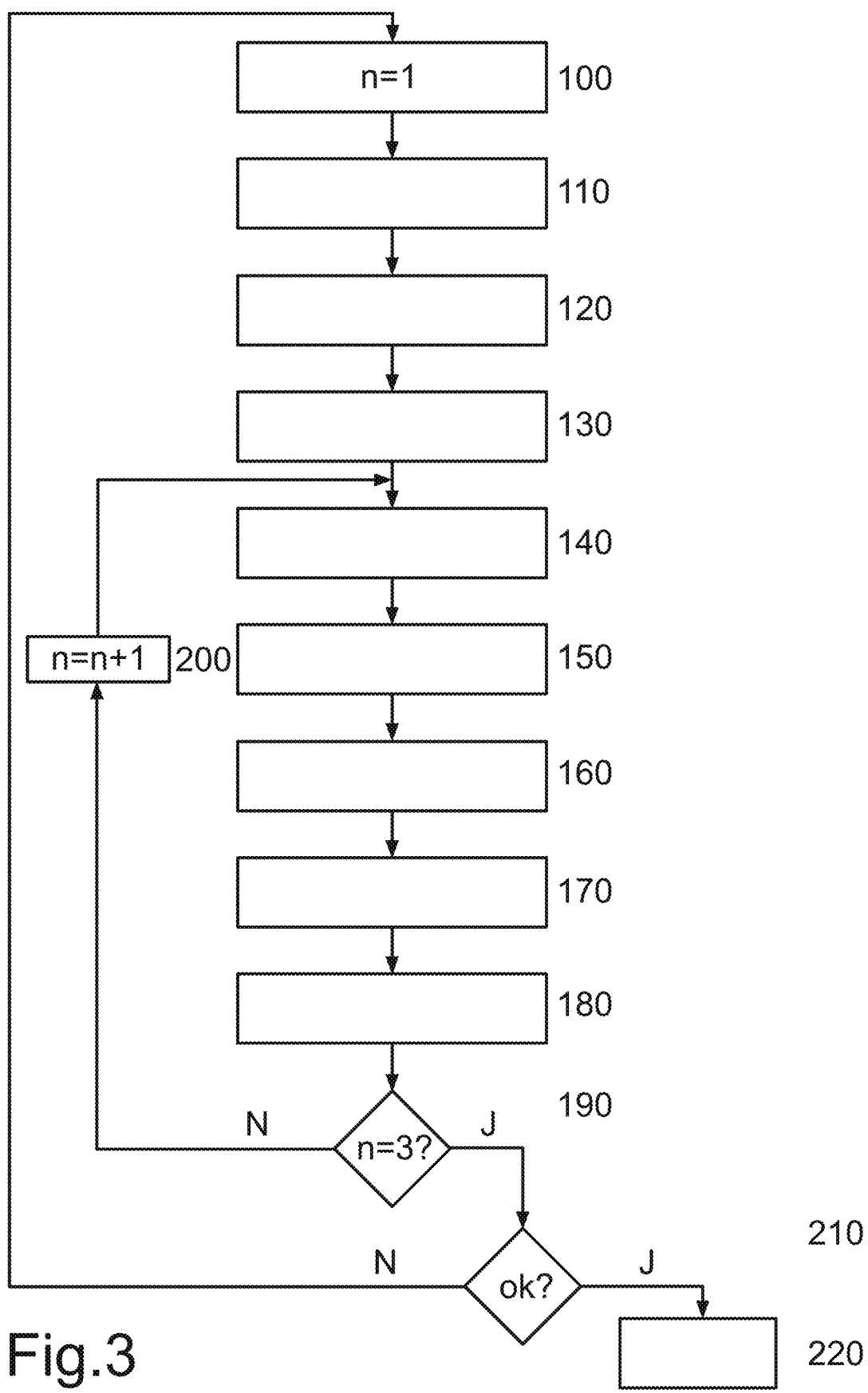
FIG. 3 a signal flowchart for an exemplary embodiment of a method according to the invention.

The communication device 32 of the vehicle charging apparatus 22 is coupled with a control device 34, which is configured to control the charging of the vehicle battery 24. In particular, the control device is configured to execute the steps shown in greater detail with reference to FIG. 3.

First, a count parameter of n=1 is set in step 100, and the up-to-date sensor values are determined for the current strength of a respective current, which flows in the first, the second, and the third electrical line VL1, VL2, VL3 at the fuse box 12. These up-to-date sensor values are input into the vehicle charging apparatus 22 in step 110.

Unless stated otherwise, the following steps are executed by the control device 34 of the vehicle charging apparatus 22: First, a maximum potential additional current load is determined in step 120 for the first, the second, and the third electrical line VL1, VL2, VL3 at connections V1 to V3 of the fuse box 12. In step 130, the vehicle battery 24 is charged with a current load per charging-apparatus-side electrical line FL1, FL2, FL3 at connections F1, F2, F3 by means of the vehicle charging apparatus 22, with said current load being equal to the lowest maximum potential additional current load determined in step 120.

In step 140, the charging capacity of a first charging-apparatus-side electrical line FL1, FL2, or FL3, i.e. of an electrical line of connections F1, F2, or F3, is varied by variation of the current load, wherein the current load is varied such that the total from the charging current load according to step 130 and the current load variation is less than or equal to the lowest maximum potential additional current load determined in step 120.

In step 150, the up-to-date sensor values are then determined for the current strength of the respective current, which flows in the first, the second, and the third electrical line VL1, VL2, VL3 at connections V1, V2, V3, wherein these values are then input again into the vehicle charging apparatus 22 in step 160.

Subsequently, the electrical line VL1, VL2, or VL3 at which the up-to-date sensor value has changed according to the variation from step 140 is determined in step 170.

In the following step 180, a first charging-apparatus-side electrical line FL1, FL2, or FL3 is assigned to a decoupling-point-side line VL1, VL2, or VL3 at the fuse box 12, for which a variation of the up-to-date sensor value was determined in step 170.

In step 190, there is a check to determine whether the count parameter is n=3. If this is negated, n=n+1 is set in step 200 and the method is returned to step 140.

If n=3 is affirmed in step 190, the method continues to step 210. In other words, the method then branches to step 210 when the assignment has been carried out for three charging-apparatus-side electrical lines FL1, FL2, FL3.

If the check in step 210 determines that the result of the last cycle does not agree with the results of the two previous cycles, for example because two charging-apparatus-side lines were assigned to the same line at the fuse box 12, the method returns to step 100. However, if a plausible result is found in step 210, the determined assignment of the decoupling-point-side lines VL1, VL2, VL3 at the fuse box 12 to the three charging-apparatus-side lines FL1, FL2, FL3 is stored in a storage device of the charging apparatus 22 in step 220.

The invention claimed is:

1. A method for operating a vehicle charging apparatus for charging the vehicle battery comprising the following steps:
   a) determining up-to-date sensor values for the current strength of a respective current, which flows in a first, a second, and a third decoupling-point-side electrical line (VL1, VL2, VL3) of a three-phase electrical decoupling point;
   b) inputting the up-to-date sensor values into the vehicle charging apparatus; further comprising the steps:
   c) determining a maximum potential additional current load for the first, the second, and the third decoupling-point-side electrical line (VL1, VL2, VL3);
   d) charging of the vehicle battery with a current load per charging-apparatus-side electrical line (FL1, FL2, FL3) by the vehicle charging apparatus, with said charging current load being less than or equal to the lowest maximum potential additional current load determined in step c);
   e) varying the charging capacity of a first charging-apparatus-side electrical line (FL1, FL2, FL3) by variation of the current load, wherein the current load is varied such that the total from the charging current load according to step d) and the current load variation is less than or equal to the lowest maximum potential additional current load determined in step c);
   f) determining the up-to-date sensor values for the current strength of the respective current, which flows in the first, the second, and the third decoupling-point-side electrical line (VL1, VL2, VL3);
   g) inputting the up-to-date sensor values into the vehicle charging apparatus;
   h) determining the electrical line (VL1, VL2, VL3) at which the up-to-date sensor value has changed according to the variation from step e);
   i) assigning the first charging-apparatus-side electrical line (FL1, FL2, FL3) to the decoupling-point-side electrical line (VL1, VL2, VL3), for which a variation of the up-to-date sensor value was determined in step h); and
   j) repeating steps e) through i) for at least one second charging-apparatus-side electrical line.

2. The method according to claim 1, wherein the charging of the vehicle battery takes place in step d) with a charging current load, per charging-apparatus-side electrical line (FL1, FL2, FL3), which is equal to the lowest maximum potential further current load determined in step c).

3. The method according to claim 1, wherein the charging capacity of the respective charging-apparatus-side electrical line (FL1, FL2, FL3) is reduced in step e).

4. The method according to claim 1, further comprising the step: k) repeating steps e) through i) for the third charging-apparatus-side electrical line (FL1, FL2, FL3).

5. The method according to claim 4, further comprising the step:
   11) checking whether the result from step k) agrees with the results from steps i) and j);
   12) if the result from step 11) is negative: repeating of steps a) through k);
   13) if the result from step 11) is positive: storing of the determined assignment of the three decoupling-point-side electrical lines (VL1, VL2, VL3) to the three charging-apparatus-side electrical lines (FL1, FL2, FL3).

6. The method according to claim 1, wherein the inputting in step b) takes place conductively or wirelessly, particularly via at least one of WLAN, ZigBee, or Bluetooth.

7. A vehicle charging apparatus for charging a vehicle battery, comprising:
   a communication device, which is configured to communicate with a sensor device of a three-phase, electrical decoupling point;
   a first, a second, and a third charging-apparatus-side electrical connection (F1, F2, F3) for supplying energy for charging the vehicle battery;
   an output connection for coupling with the vehicle battery;
   a control device for controlling the charging of the vehicle battery, where-in the control device is configured to implement the following step:
   inputting up-to-date current values for the current strength of a respective current into the vehicle charging apparatus by the communication device, said current flowing in a first, a second, and a third decoupling-point-side electrical line (VL1, VL2, VL3) at the connections (V1, V2, V3) of the decoupling point;
   wherein the control device is further configured to implement the following steps:
   determining a maximum potential additional current load for the first, the second, and the third decoupling-point-side electrical line (VL1, VL2, VL3);
   charging of the vehicle battery with a charging current load per charging-apparatus-side electrical connection (F1, F2, F3), with said charging current load being less than or equal to the lowest maximum potential additional current load determined in the previous determination step;
   varying the charging capacity at a first charging-apparatus-side electrical connection (F1, F2, F3) by varying the current load, wherein the current load is varied such that the total from the charging current load and the current load variation is less than or equal to the lowest maximum potential additional current load determined;
   inputting the up-to-date current values into the vehicle charging apparatus;
   determining the electrical line (VL1, VL2, VL3) at which the up-to-date sensor value has changed according to the variation;
   assigning the first charging-apparatus-side electrical line (F1, F2, F3) to the decoupling-point-side electrical line (VL1, VL2, VL3), for which a variation of the up-to-date sensor value was determined in the previous step; and
   repeating the steps of varying the charging capacity for at least one second charging-apparatus-side electrical connection (F1, F2, F3) up to assignment of the charging-apparatus-side electrical connection (F1, F2, F3).

8. A system comprising a sensor device of a three-phase decoupling point and a vehicle charging apparatus for charging a vehicle battery, comprising:
- a communication device, which is configured to communicate with a sensor device of a three-phase, electrical decoupling point;
- a first, a second, and a third charging-apparatus-side electrical connection (F1, F2, F3) for supplying energy for charging the vehicle battery;
- an output connection for coupling with the vehicle battery;
- a control device for controlling the charging of the vehicle battery, where-in the control device is configured to implement the following step:
- inputting up-to-date current values for the current strength of a respective current into the vehicle charging apparatus by the communication device, said current flowing in a first, a second, and a third decoupling-point-side electrical line (VL1, VL2, VL3) at the connections (V1, V2, V3) of the decoupling point;
- wherein the control device is further configured to implement the following steps:
- determining a maximum potential additional current load for the first, the second, and the third decoupling-point-side electrical line (VL1, VL2, VL3);
- charging of the vehicle battery with a charging current load per charging-apparatus-side electrical connection (F1, F2, F3), with said charging current load being less than or equal to the lowest maximum potential additional current load determined in the previous determination step;
- varying the charging capacity at a first charging-apparatus-side electrical connection (F1, F2, F3) by varying the current load, wherein the current load is varied such that the total from the charging current load and the current load variation is less than or equal to the lowest maximum potential additional current load determined;
- inputting the up-to-date current values into the vehicle charging apparatus;
- determining the electrical line (VL1, VL2, VL3) at which the up-to-date sensor value has changed according to the variation;
- assigning the first charging-apparatus-side electrical line (F1, F2, F3) to the decoupling-point-side electrical line (VL1, VL2, VL3), for which a variation of the up-to-date sensor value was determined in the previous step; and
- repeating the steps of varying the charging capacity for at least one second charging-apparatus-side electrical connection (F1, F2, F3) up to assignment of the charging-apparatus-side electrical connection (F1, F2, F3).

* * * * *